United States Patent
Williamson et al.

(10) Patent No.: US 6,192,461 B1
(45) Date of Patent: Feb. 20, 2001

(54) METHOD AND APPARATUS FOR FACILITATING MULTIPLE STORAGE INSTRUCTION COMPLETIONS IN A SUPERSCALAR PROCESSOR DURING A SINGLE CLOCK CYCLE

(75) Inventors: Barry D. Williamson; Jim E. Phillips, both of Round Rock; Dq Nguyen, Austin, all of TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/016,654

(22) Filed: Jan. 30, 1998

(51) Int. Cl.$^7$ ............... C06F 9/06; C06F 9/312; C06F 9/305

(52) U.S. Cl. ............. 712/23; 712/215; 712/223; 712/235

(58) Field of Search ............... 712/23, 217, 26, 712/43, 215, 223, 235

(56) References Cited

U.S. PATENT DOCUMENTS

| | | | |
|---|---|---|---|
| 4,594,660 | * | 6/1986 | Guenthner et al. ............... 712/23 |
| 5,621,896 | * | 4/1997 | Burgess et al. ............... 711/118 |
| 5,664,215 | * | 9/1997 | Burgess et al. ............... 712/23 |
| 5,696,955 | * | 12/1997 | Goddard et al. ............... 712/222 |
| 5,857,089 | * | 1/1999 | Goddard et al. ............... 712/222 |
| 5,887,152 | * | 3/1999 | Tran ............... 712/217 |
| 5,926,645 | * | 7/1999 | Williamson ............... 712/23 |

* cited by examiner

Primary Examiner—Thomas C. Lee
Assistant Examiner—Walter Benson
(74) Attorney, Agent, or Firm—Anthony V. S. England

(57) ABSTRACT

One aspect of the invention relates to an apparatus for processing a store instruction on a superscalar processor that employs in-order completion of instructions, the processor having an instruction dispatch unit, an architected register file, a rename register file, a load store unit, a completion unit and cache memory. In one embodiment of the invention, the apparatus includes a pointer queue having an entry corresponding to the store instruction, the entry containing a pointer to the entries in the architected and rename register files that contain data required by the store instruction; and a multiplexer coupled to read ports on the architected and rename register files so that data can be passed from one of the register files into an entry in a data queue, the data queue being coupled to the cache memory.

8 Claims, 12 Drawing Sheets

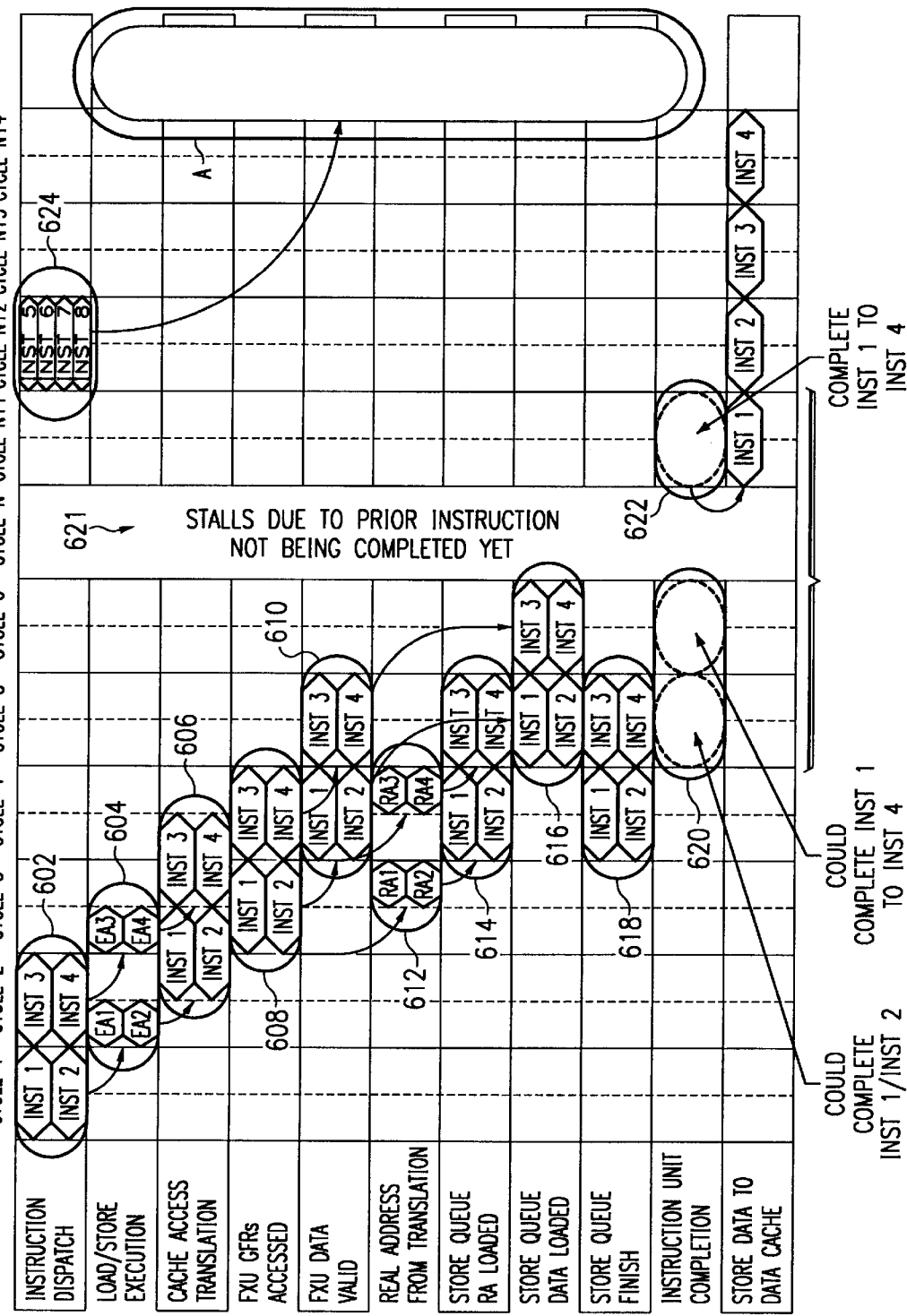

DATA QUEUE ENTRY  *FIG. 10A*
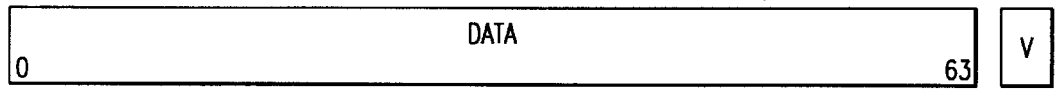
TAG QUEUE ENTRY  *FIG. 10B*
STORE POINTER QUEUE ENTRY  *FIG. 10C*
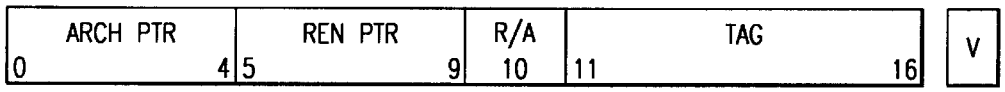
FINISH QUEUE ENTRY  *FIG. 10D*
ADDRESS CONTROL ENTRY  *FIG. 10E*
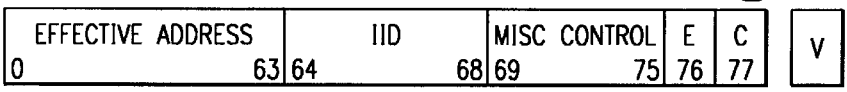
RA QUEUE ENTRY  *FIG. 10F*
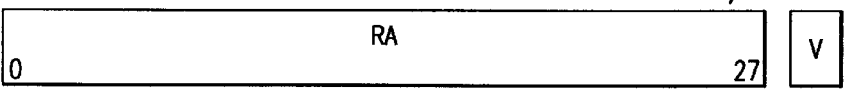

METHOD AND APPARATUS FOR FACILITATING MULTIPLE STORAGE INSTRUCTION COMPLETIONS IN A SUPERSCALAR PROCESSOR DURING A SINGLE CLOCK CYCLE

FIELD OF THE INVENTION

The present invention relates generally to a processing system and more particularly for increasing the rate of store instruction completions in a processing system.

BACKGROUND OF THE INVENTION

In the continuing development of faster and more powerful computer systems, a significant microprocessor has been utilized, known as a reduced instruction set computer (RISC) processor. Increased advances in the field of RISC processors have led to the development of superscalar processors. Superscalar processors, as their name implies, perform functions not commonly found in traditional scalar microprocessors. Included in these functions is the ability to execute instructions out-of-order with respect to the program order. Although the instructions occur out-of-order, the results of the executions appear to have occurred in program order, so that proper data coherency is maintained.

A common bottleneck in superscalar processor performance is the number of instructions which can be outstanding within the processor at a given time. Typically, the instruction unit includes a queue which indicates the number of outstanding instructions. The queue typically suspends any future dispatching of instructions if a maximum number is reached.

One type of instruction which can be slow to complete is the store instruction. A store instruction is slow to complete for a number of reasons. For example, store instructions are slow to complete due to the maximum number of stores which can be completed per cycle, and due to the number of stores which can update the cache each cycle. Conventional superscalar processors typically only complete one store instruction per cycle. This often causes dispatch stalls. Accordingly, a need exists for a system that efficiently and effectively combats such problems and decreases the number of dispatch unit stalls due to the lack of store instructions completions to enhance overall processor performance.

SUMMARY OF THE INVENTION

Accordingly, the present invention is directed to increasing the number of store instructions that can be completed during a cycle. A method and system for handling multiple store instruction completions in a processing system after a stall condition is disclosed. The processing system includes an instruction unit, the instruction unit including a dispatch unit and a completion unit, a translation unit and at least one execution unit. A load store unit comprises an instruction queue for receiving a plurality of instructions from the dispatch unit; at least one effective address (EA) unit for receiving the plurality of instructions from the instruction queue, and a store queue. The store queue is coupled to the translation unit, the at least one execution unit and the at least one EA unit. The store queue receives data and real address information relating to each of the plurality of instructions from the at least one execution unit prior to completion of each of the plurality of instructions.

In so doing, the bottleneck associated with conventional systems, i.e., a maximum number of instructions that can be dispatched by the instruction unit is reduced, According to one embodiment of the present invention, there is provided a circuit for use in superscalar processors which allows for rapid completion of Store instructions which are queued up in a completion table. According to this embodiment of the invention, a data queue is provided which stores the data for the Store instruction. After the Store instruction is executed, and its effective address is available, the circuit determines the location of the data required by the store instruction from the GPR or rename registers. If the instruction which originally generated the data required by the Store instruction has successfully completed, then the data will be architected, i.e., stored in the general purpose registers ("GPRs") or floating point registers ("FPRs") depending on whether the instruction was a fixed or floating point operation. For purposes of present discussion, fixed point instructions will be presumed. It will be understood that extension of the present invention to floating point instructions will be easily within the skills of one in the art.

If the instruction which generated the data required by the Store instruction has not yet completed, but has been processed to a final result by the relevant execution unit, then the data will be stored in the rename registers as valid. If the instruction has not yet generated the data required by the Store instruction, then the rename register set aside to receive the data will be marked by the processor as invalid.

Once the data required by the Store instruction is available, whether in a GPR or in a valid rename register, then the data is passed into an entry in the data queue. Read ports are provided on the rename register to facilitate this operation. Since, in the present version of the invention, completion must occur in program order, the step of passing data into the data queue may occur long before the completion queue pointer points to the Store instruction as the next instruction to complete. This is especially true if completion has been stalled by an instruction issued before the Store instruction. When it is time for the Store instruction to complete, the data required by the Store instruction is already in the data queue and may be sent to the cache, no access is required to the GPRs as with conventional processors. This permits multiple Store instructions to be completed in a single clock cycle because there is no bottleneck at the GPR ports since the data has been "preloaded" while the Store instructions were waiting for their turns in the completion window. This, of course, is not possible in conventional processors which have only a single read port on the GPRs. More ports could be added, but this would require additional design, chip real estate and complexity. Still other objects and advantages of the invention will become clear to those of skill in the art in view of the following disclosure of detailed embodiments of the invention.

These and other advantages of the aspects of the present invention will be more fully understood in conjunction with the following detailed description and accompanying drawings.

BRIEF DESCRIPTION OF THE DRAWINGS

FIG. 8 is a timing diagram which illustrates the operation of the data flow of FIG. 7.

FIGS. 10A–10F depict the logical contents of the various queues used in the embodiment shown in the processor of FIG. 9.

DETAILED DESCRIPTION

The present invention relates to increasing the number of store instructions that can be completed in a superscalar processor to reduce dispatch stalls. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
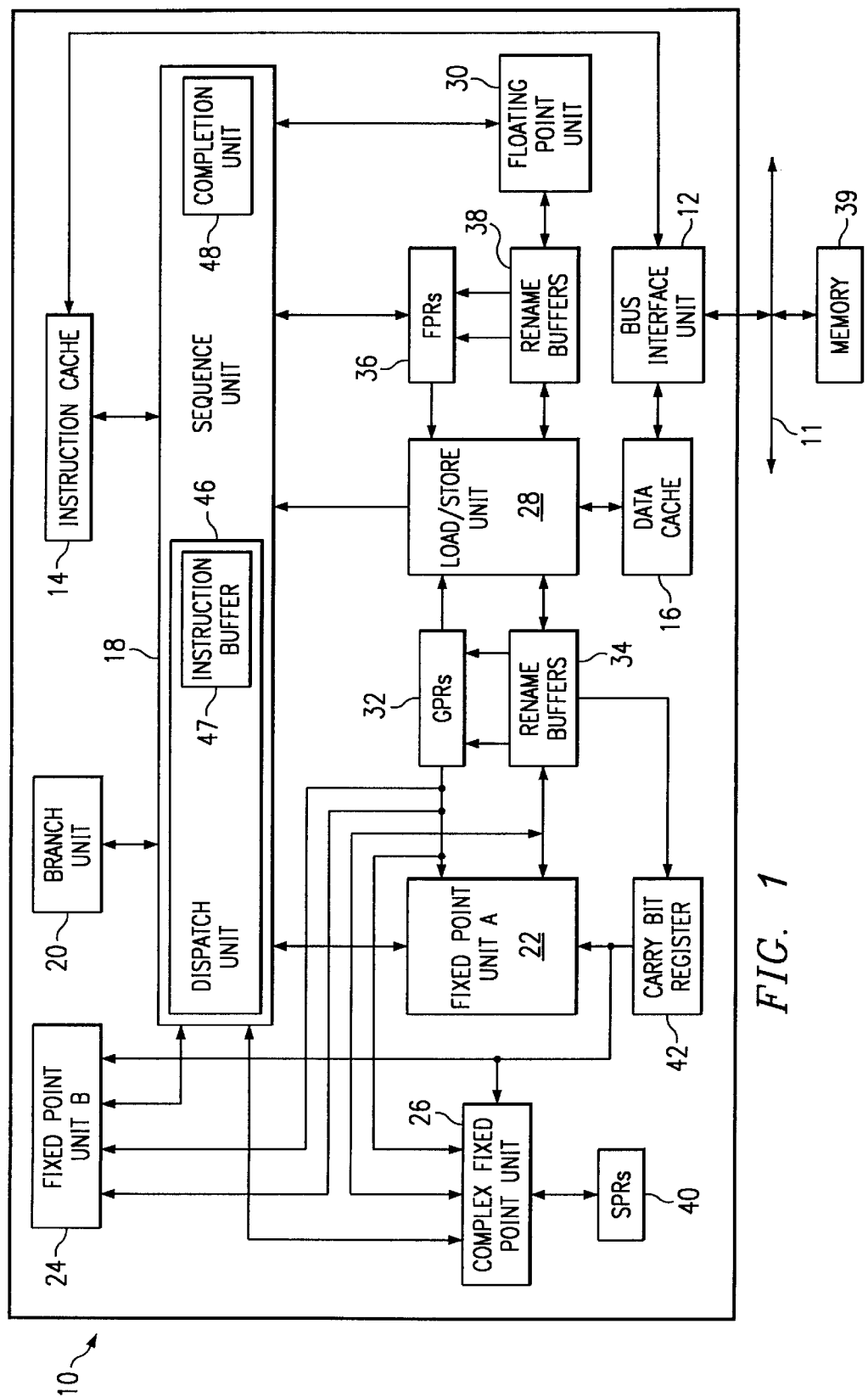
FIG. 1 illustrates a block diagram of a computer system in accordance with the present invention.

FIG. 1 is a block diagram of a processor system 10 for processing information in accordance with the present invention. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, Oring and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed at six stages, namely fetch, decode, dispatch, execute, completion and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32, FPRs 36, renames 34 and 38 and copies such information to data cache 16 or memory.

As an example of the interaction among the execution units, e.g., FXUA 22, FXUB 24, rename buffers 34, and the dispatch unit 46, an instruction "add c,a,b" is dispatched from the dispatch unit 46 to the FXUA 22. The dispatch unit 46 provides the FXUA 22 with tags for the operands "a" and "b" to tell the FXUA 22 where to retrieve the data for the operands, as is well understood by those skilled in the art. For example, in a system with six rename buffers, the dispatch unit 46 might suitably tag the operand for "a" as being located in a rename buffer 1 with a six bit tag 100000. A tag of 010000 might then suitably be used to indicate that the operand "b" is in the rename buffer 2. Since the FXUA 22 does not write into GPRs 32, the dispatch unit 46 must use a rename buffer tag for the target of the operation, such as 001000, for the result of the "add" instruction to be placed in rename buffer 3.

As before mentioned, one of the problems with the prior art system is that only one store instruction can be completed in one cycle. To illustrate this problem in a conventional system refer now to FIG. 2 in conjunction with the accompanying description.

Figure 2:
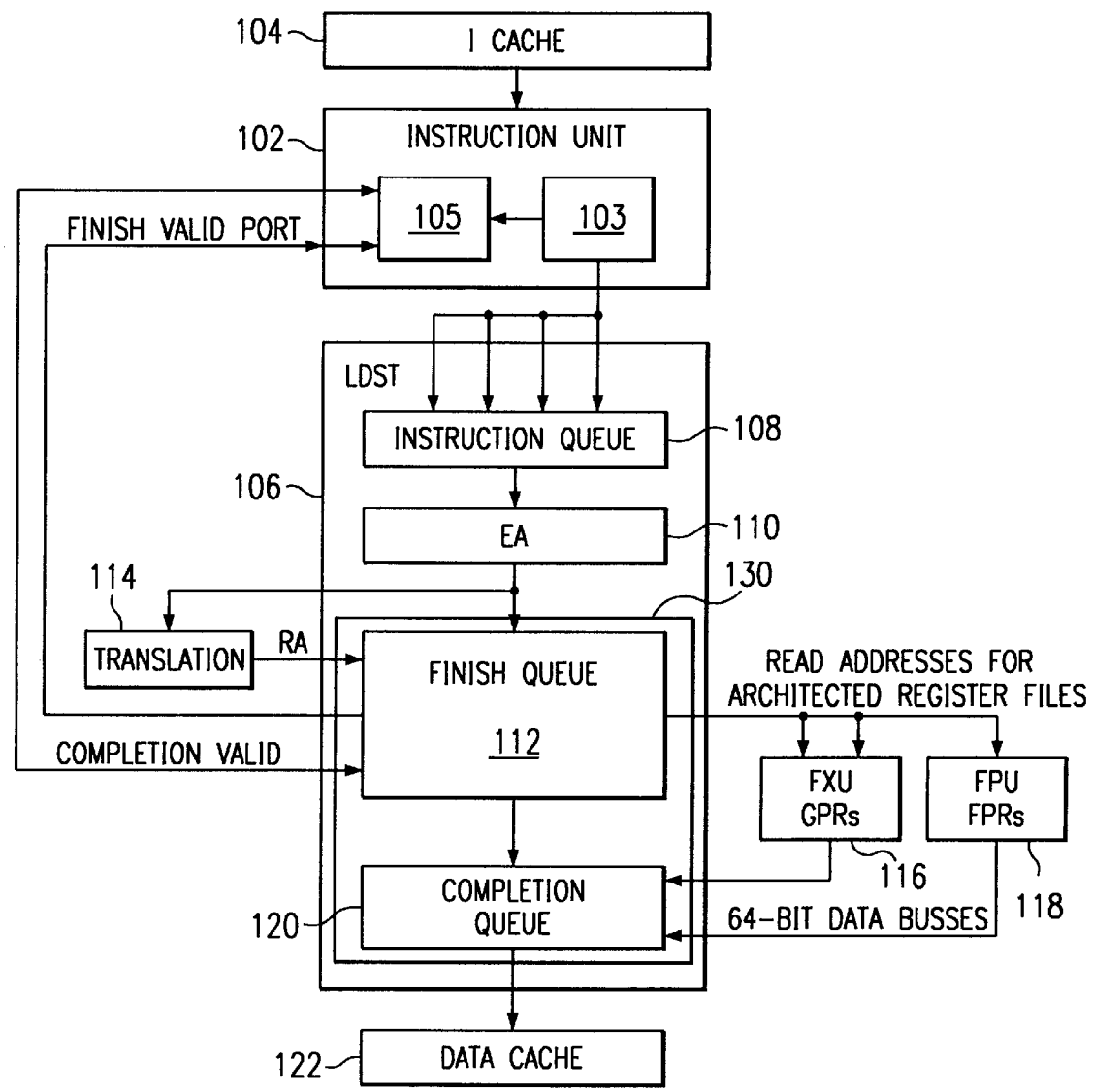
FIG. 2 is a conventional system for completing store instructions in a processing system.

FIG. 2 is a conventional system for completing store instructions in a processing system. In this embodiment, the instruction unit 102 includes a dispatch unit 103 and a completion unit 105. The instruction unit 102 receives instructions from an instruction cache 104 in the dispatch unit 103. The dispatch unit 103 then provides the store instruction received from the instruction cache to the Load/Store (LDST) unit 106. The dispatch unit 103 also sends the store instruction to the completion unit 105. If there are previous instructions within LDST 106, the store instruction is provided to an instruction queue 108. If there are no previous instructions within the LDST 106, then the instruction queue 108 is bypassed and the store instruction can be provided directly to an effective address (EA) unit 110. In either case, the EA unit 110 then receives the address information for a particular instruction.

The control instruction of the effective address is provided to a finish queue (FQ) 112 of the store queue 130, while information about the address is provided to the translation unit 114. The translation unit 114 translates EA information into a real address (RA) and provides the RA to the FQ 112. The FQ 112 then provides a finish valid signal to the completion unit 105. The completion unit 105 then provides a complete valid signal to the FQ 112. The FQ 112 then sends addresses into the fixed unit (FXU) 116 and floating point unit (FPU) 118. The FXU and FPU then provide data related to those addresses to completion queue (CQ) 120. The FQ 112 also provides the RA information to the CQ 120. The CQ 120 can then provide the store instruction to the data cache 122.

Figure 3:
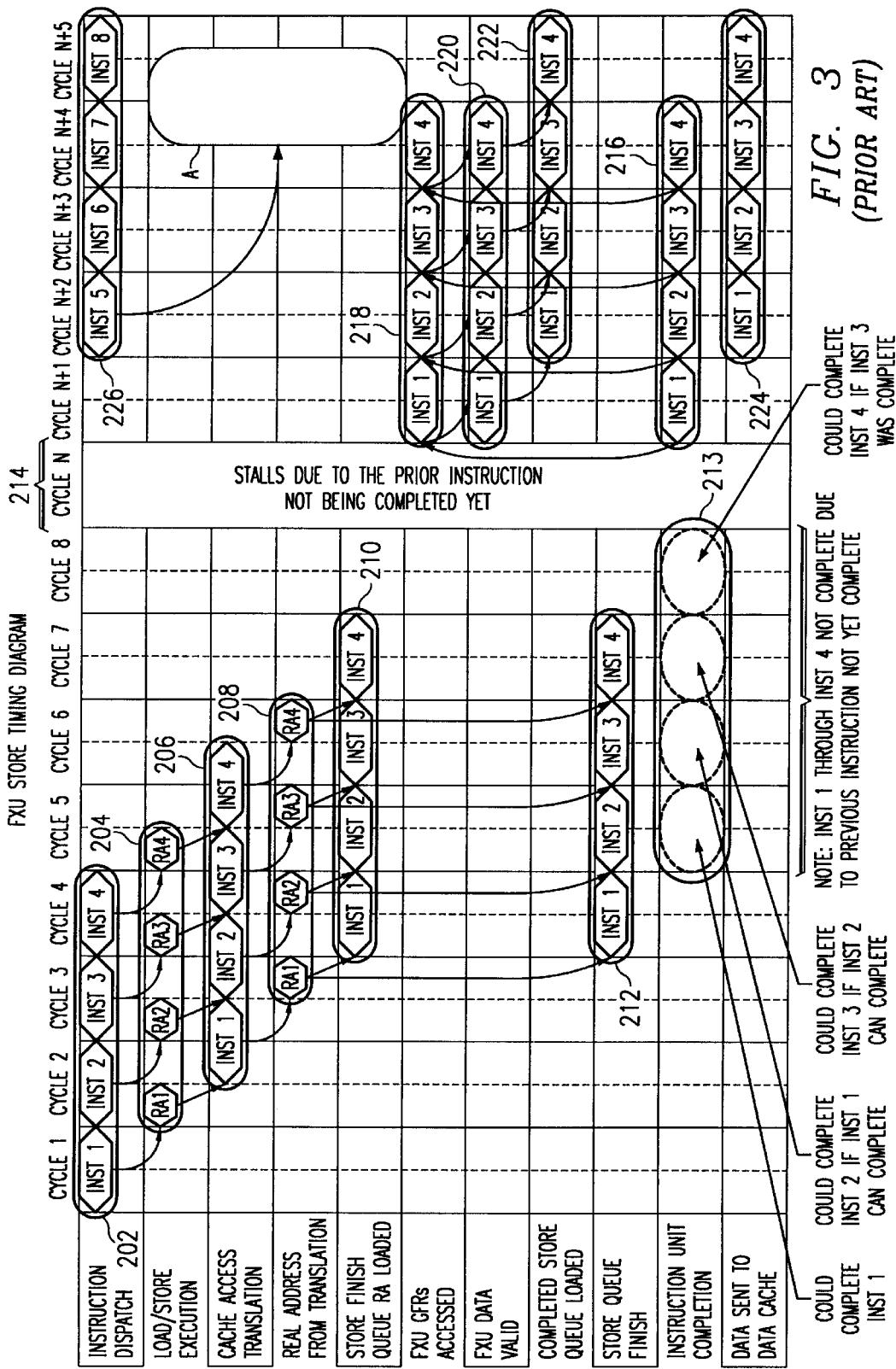
FIG. 3 is a timing diagram which illustrates the operation of the data flow of FIG. 2.

Referring now to FIG. 3, what is shown is a timing diagram of the data flow for a plurality of store instructions 1–4 of the fixed execution (FXD) unit 116. In this embodiment, shown generally at 202, as is seen instruction 1 is dispatched in cycle 1, instruction 2 is dispatched in cycle 2, instruction 3 is dispatched in cycle 3, and instruction 4 is dispatched in cycle 4. Thereafter, shown generally at 204, the LDST unit 106 executes the effective address of the instruction 1 (EA1) in the first half of cycle 2, the effective address of instruction 2 (EA2) in the first half of cycle 3, the effective address of instruction 3 (EA3) in the first half of cycle 4 and the effective address of instruction 4(EA4) in the first half of cycle 5. The accessing of translated addresses of instructions 1–4 is shown generally at 206. The accessing of the address of instruction 1 between the second half of cycle 2 and the first half of cycle 3, on instruction 2 between the second half of cycle 3 and the first half of cycle 4, on instruction 3 between the second half of cycle 4 and the first half of cycle 5, and on the address of instruction 4 between the second half of cycle 5 and the first half of cycle 6.

The real addresses are then provided from the translation unit, shown generally at 208. The real address of instruction 1 (RA1) is provided during the second half of cycle 3, the real address of instruction 2 (RA2) is provided during the second half of cycle 4, the real address of instruction 3 (RA3) is provided during the second half of cycle 5 and the real address of instruction 4 (RA4) is provided during the second half of cycle 6.

In this embodiment, the finish queue as before-mentioned is loaded with real address values for instructions 1–4 during cycles 4–7, respectively, which is shown generally at 210. The instructions 1–4 can finish at cycles 4–7, shown generally at 212. Even if instructions 1–4 could be completed, there is a structural dependency among the instructions, due to the single read Port on the architected register file, which limits the performance of the processor, shown generally at 213. That is, instruction 1 could be completed at cycle 5, instruction 2 could only be completed at cycle 6 if instruction 1 is completed, instruction 3 could only be completed at cycle 7 if instructions 1 and 2 are completed. Finally, instruction 4 can be completed only if instructions 1–3 have been completed at cycle B.

After a stall condition shown generally at 214 and if the instruction completion unit is full, beginning at cycle n+1, then instructions 1–4, shown generally at 216, can be completed one at a time, due to the before mentioned structural dependency. This is accomplished through the completion unit 105 initiating a completion signal for instructions 1–4 during cycles n+1 to cycle n+4 respectively. Hence, the fixed unit general purpose registers (GPRS) may be accessed to obtain data for instructions 1–4 from cycle n+1 to cycle n+4 respectively shown generally at 218. The data valid signal for each of the instructions are also provided from cycle n+1 to cycle n+4 respectively, shown generally at 220.

Thereafter, the completed store queue is loaded with instructions 1–4, shown generally at 222. Instruction 1 is loaded in the completed store queue at cycle n+2. Instruction 2 is loaded in the completed store queue at cycle n+3. Instruction 3 is loaded into the completed store queue at cycle n+4. Instruction 4 is loaded into the completed store queue at cycle n+5. The data for instructions 1–4 are then sent one instruction at a time to the data cache during cycles n+2 to cycle n+5 in the instruction unit respectively, shown generally at 224.

If the processor had reached its limit as to the maximum number of outstanding instructions, then in cycle N+2 only 1 instruction can be dispatched. This also applies to cycles N+3 through N+6. Accordingly, instructions 5–8 generally shown at 226, have to be dispatched sequentially because the completion unit is full. Accordingly, this penalty in dispatch time affects the overall performance of the processor.

The problem with this data flow is that due to the above-described finish queue/completion queue interaction, the dispatching of instructions is significantly delayed if a dispatch stall occurs where the completion unit 105 is full. A conventional approach to overcoming this problem is to add additional ports on the execution units. This approach adds additional expense and complexity to the system. Accordingly, what is needed is a method and system for improving the overall performance of a processor by completing multiple store instructions after a dispatch stall has occurred that is simpler than known approaches.

A system and method illustrated in accordance with the present invention substantially improves the performance of a processor by completing multiple store instructions after a stall condition occurs and the completion buffer is full. Also, the completion buffer is not filled as fast as in conventional processors. In the present invention, the store queue is a single queue rather than being a combination of a finish queue and complete queue. In addition, the data related to a store instruction is accessed prior to the completion of instruction rather than after completion. The store instruction can then be finished when either of the following two conditions are met, the real address (RA) and data is loaded in the store queue, or the RA is loaded in the store queue and the data is being sent to the store queue. By accessing the data earlier, multiple store instructions can be completed substantially simultaneously. Accordingly, multiple instructions can be dispatched after a dispatch stall when the completion buffer is full. In so doing, a system is provided which enables a plurality of store instructions to be completed simultaneously and thereby substantially reducing instruction dispatch delays by freeing up entries in the completion buffer.

Figure 4:
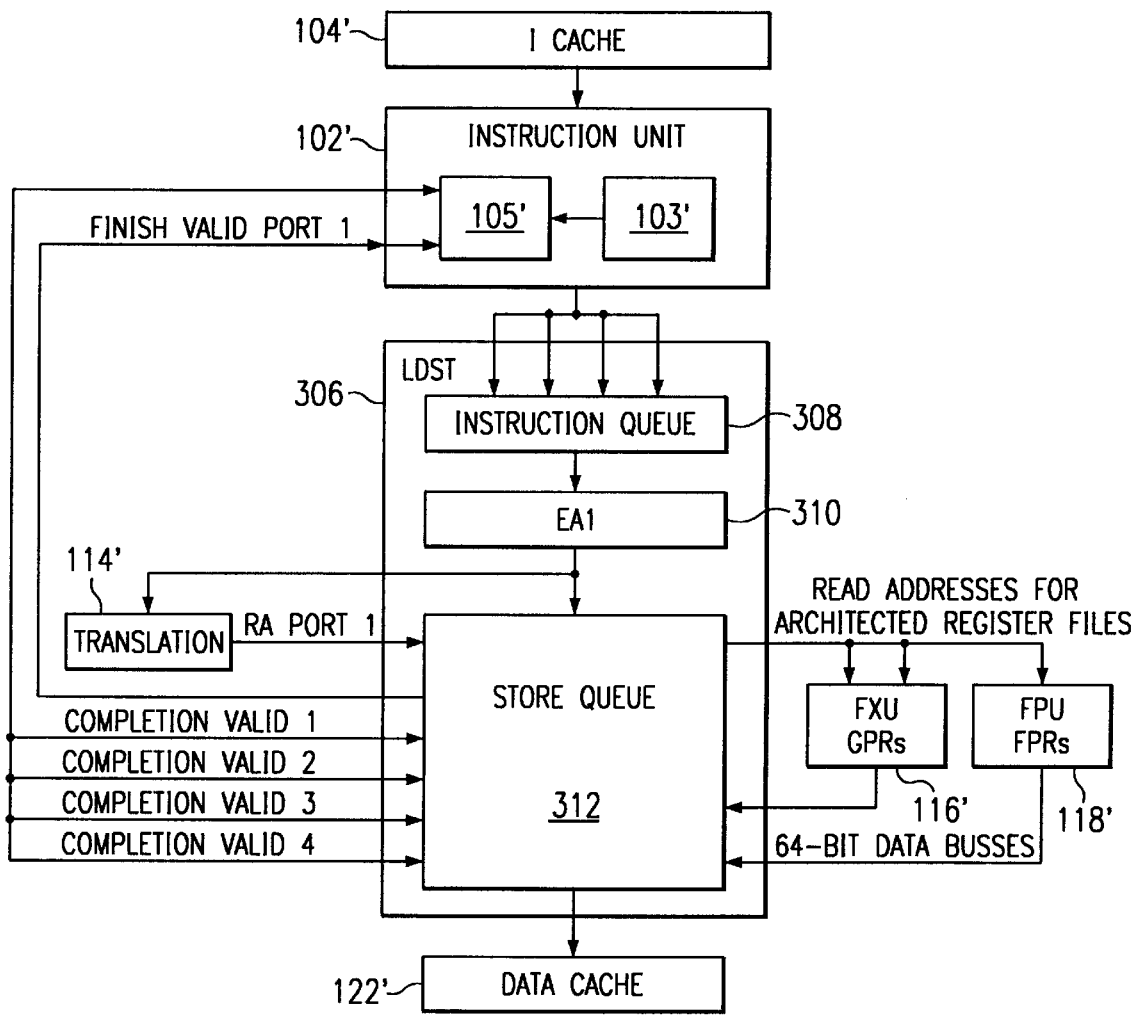
FIG. 4 is a diagram that illustrates a first embodiment of the data flow for completing a plurality of store instructions in accordance with the present invention where a single LSU accesses the GPRs and FPRs.

The following discussion will more particularly describe the present invention. FIG. 4 is a first embodiment of a store instruction data flow which provides a single store instruction execution per cycle in accordance with the present invention. There are several elements similar to those elements shown in FIG. 2. These elements have been given similar designations to those of FIG. 2. However, there are some critical differences. The first is that the store queue 312 of the Load/Store unit 306 is a single queue rather than a combination of a finish queue and completion queue. In this arrangement, the completion unit 105 completes the store instructions and the store queue 312 marks the appropriate entries when completed. In a preferred embodiment, the store queue 312 is 16 entries deep. That is, 16 store instructions can be stored in the store queue. Also, in a preferred embodiment, a bit within each entry is made active based upon the completion signal from the instruction unit. In addition, the operation of this dataflow is different from that described with respect to the store instruction dataflow of FIG. 2. As described above, data is accessed prior to completion of the store instruction. The store instruction is finished when one of two conditions are met: (1) either the real address and data are loaded in the store queue, or (2) the real address is loaded in the store queue and the data is being sent to the store queue.

Figure 5:
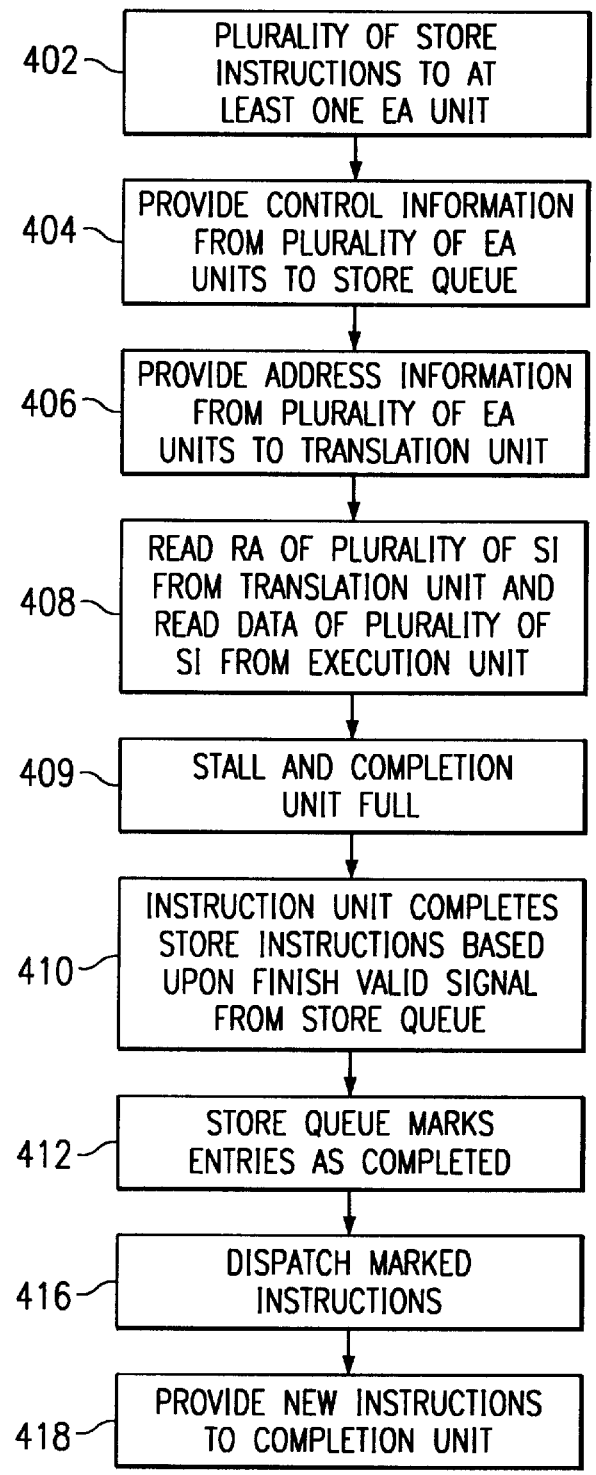
FIG. 5 is a flow chart illustrating the data flow for completing store instructions in accordance with the present invention.

To more particularly describe these differences, refer now to FIG. 5 which is a flow chart which generally illustrates the operation of the data flow of FIG. 4.

First, a plurality of store instructions are provided to effective address EA unit 310 within Load/Store unit 306 from the dispatch unit 103, via step 402. The EA unit 310 provides control information to the store queue 312, via step 404. The EA unit 310 provides address information to the translation unit 114, via step 406. The real addresses (RA) related to the plurality of store instructions are read from the translation unit 114, and data related to the plurality of store instructions are read from the FXU unit 116, via step 408. After a dispatch stall occurs, the completion unit is full, via step 409.

The completion unit 105' completes the plurality of store instructions within its completion window based upon a finish valid signal received from the store queue 312, via step 410. The store queue marks its entries as completed, via step 412. Thereafter, the same number of new instructions can be dispatched from the dispatch unit 105, via step 416, and provided to the completion unit 105', via step 418. In so doing, dispatch stalls are greatly reduced by the present invention.

Figure 6:
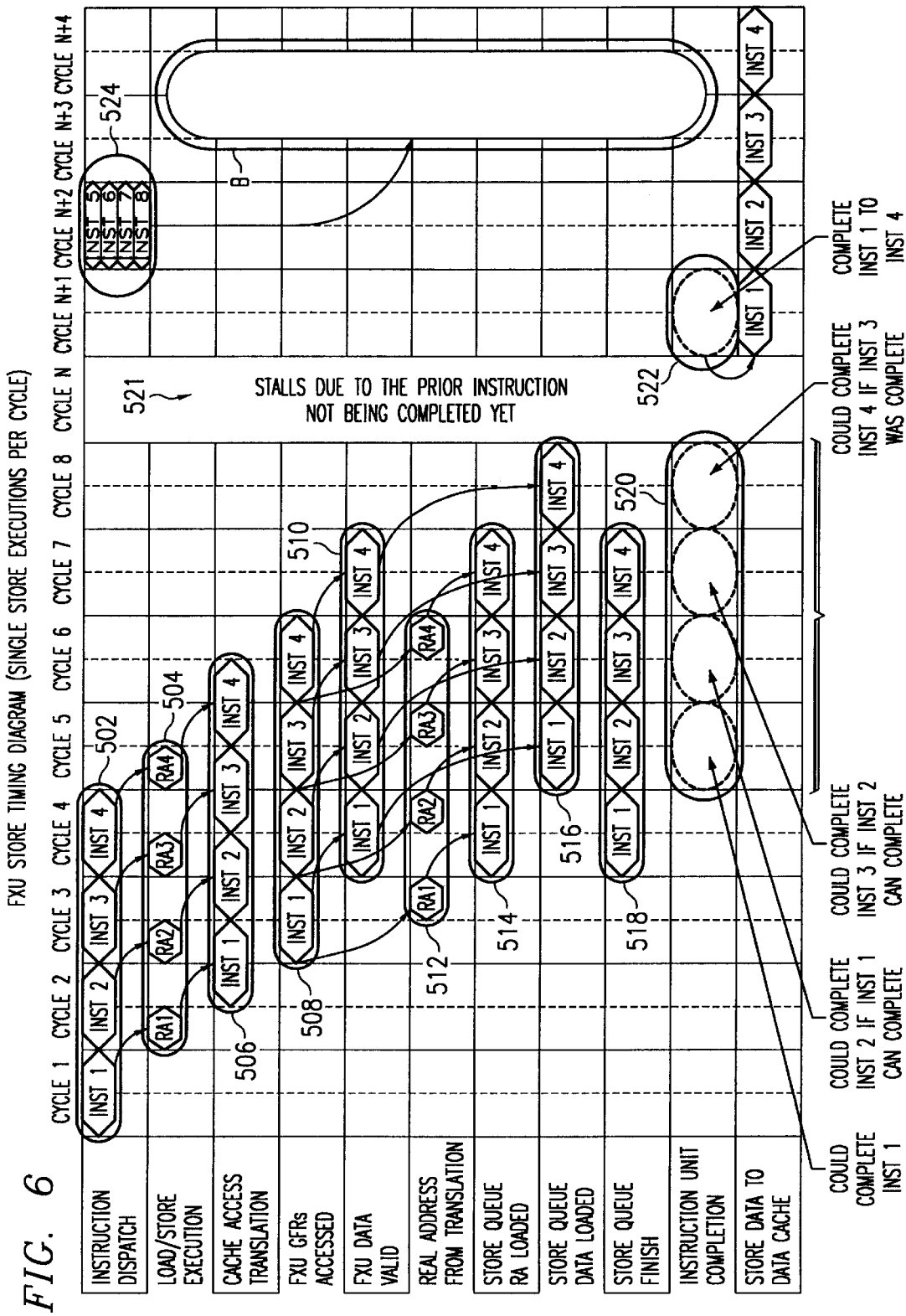
FIG. 6 is a timing diagram which illustrates the operation of the data flow of FIG. 4.

To more particularly explain the operation of the present invention and to contrast it with the timing diagram of a data flow of FIG. 2, refer now to FIG. 6 in conjunction with FIG. 3. FIG. 6 is a timing diagram of the dataflow of FIG. 4. In the embodiment of FIG. 6, as shown generally at 502, an instruction 1 is dispatched in cycle 1, instruction 2 is dispatched in cycle 2, instruction 3 dispatches in cycle 3, and instruction 4 is dispatched in cycle 4 in a manner similar to 202 of FIG. 3. Thereafter, similar to that shown at 204 of FIG. 3, the loadstore unit executes the effective address of the instruction 1 (EA1) in the first half of cycle 2, the effective address of instruction 2 (EA2) in the first half of cycle 3, the effective address of instruction 3 (EA3) in the first half of cycle 4 and the effective address of instruction 4 (EA4) in the first half of cycle 5, shown generally at 504 of FIG. 6.

Thereafter, the cache translation access for translation of instructions 1–4 occurs in a manner similar to that shown at 206 of FIG. 3. The accessing of the cache for the translated address of instruction 1 occurs between the second half of cycle 2 and the first half of cycle 3, accessing the cache for the translated address of instruction 2 occurs between the second half of cycle 3 and the first half of cycle 4, accessing the cache for the translated address of instruction 3 occurs between the second half of cycle 4 and the first half of cycle 5, and accessing the cache for the translated address of instruction 4 occurs between the second half of cycle 5 and the first half of cycle 6 as shown generally at 506 of FIG. 6.

In contrast to FIG. 3, however, next, the architected register files (GPRs) are accessed, shown generally at 508, if the data is available. The data for instruction 1 is accessed at cycle 3, then the data for instruction 2 is accessed at cycle 4, the data for instruction 3 is accessed at cycle 5, and the data for instruction 4 is accessed at cycle 6.

Next, the data for real addresses (RA1–RA4) are provided from translation unit and data valid signal is provided from the FXU 116' to the store queue 312 shown generally at 510 and 512, respectively. In this embodiment, the data valid signal for instruction 1 is provided during cycle 4, the data valid signal for instruction 2 is provided during cycle 5, the data valid signal for instruction 3 is provided during cycle 6 and the data valid signal for instruction 4 is provided during cycle 7. RA1 is provided during the second half of cycle 3, RA2 is provided during the second half of cycle 4, RA3 is provided during the second half of cycle 5, and RA4 is provided during the second half of cycle 6.

In this embodiment, the store queue 312 is loaded with real address values for instructions 1–4 during cycles 4–7, respectively, shown generally at 514. The store queue finish for each of the instructions 1–4 takes place during the same cycles that the store real addresses are loaded in the store queue, shown generally at 518, and the FXU 116' data valid signal is provided, shown generally at 510. Accordingly, the store queue finish can occur if one of two conditions are met: 1) either the RA and data are loaded in the store queue for the instructions 1–4, or (2) the RA is loaded and the data is being transferred into the store queue for instructions 1–4. Next, the data for instructions 1–4 is loaded into the store queue 312 if it is available, during cycles 5–8, respectively, shown generally at 516.

After the stall condition, shown generally at 521, the four instructions can be completed simultaneously, shown at 522. This is in contrast to the system of FIG. 3, where the four instructions must be completed sequentially. The completion unit 105' then initiates a completion signal for instructions 1–4 during the cycle n+1. Also, since all the instructions have been marked as completed, the dispatch unit 103' can dispatch instructions 5–8 at the same time (cycle n+2) shown generally at 524.

If the processor had reached its limit as to the maximum number of outstanding instructions per cycle N+2 this implementation allows up to 4 instructions per cycle to be dispatched in cycle N+2, whereas the prior art implementation would only be allowed to dispatch one instruction.

Figure 7:
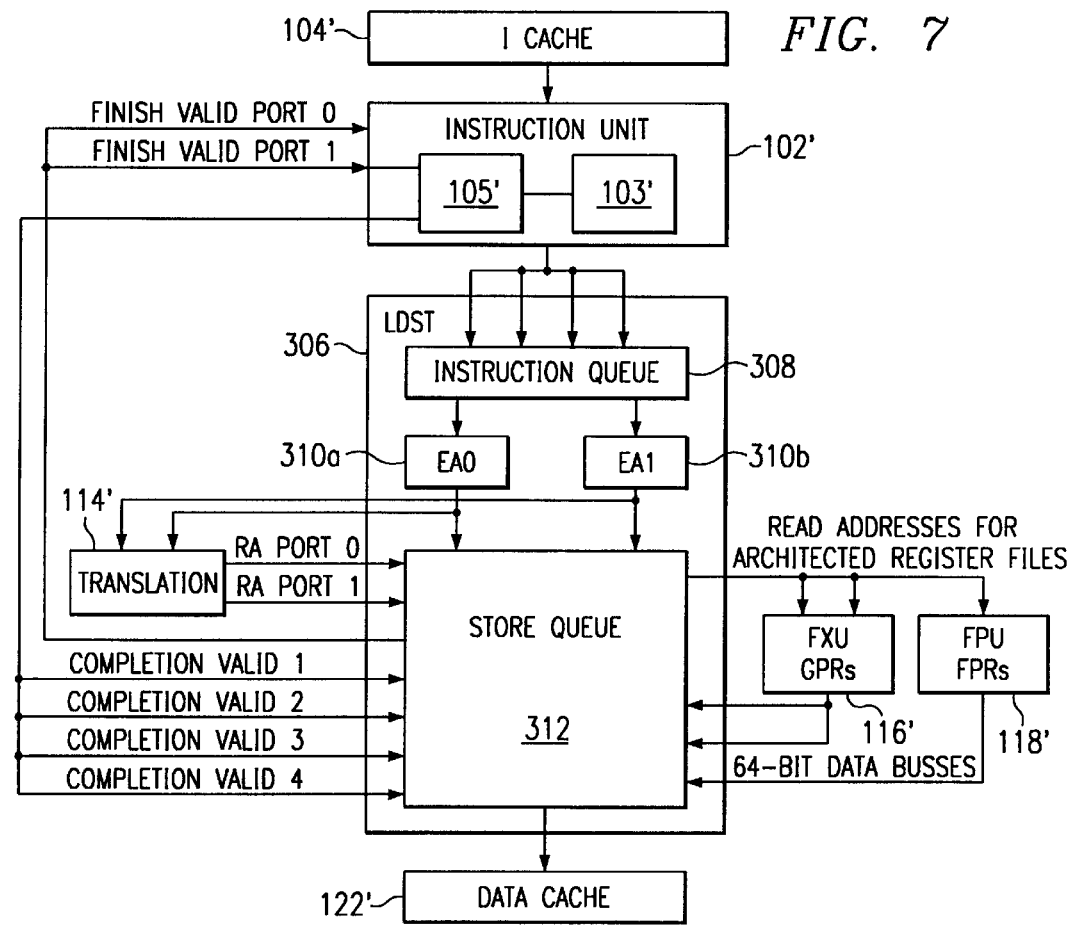
FIG. 7 is a diagram that illustrates a second embodiment of the data flow for completing a plurality of store instructions in accordance with the present invention where a dual LSU accesses the GPRs and FPRs.

FIG. 7 shows the data flow of store instructions of a preferred embodiment of the present invention. This data flow supports up to two instructions per cycle. The elements are similar to that of FIG. 5. The common elements have been given similar designations. There are some differences. As is seen, however, the are two EA units 310a and 310b. There are also two ports for FXU 116'. Since there are two ports on FXU 116", then the translation unit 114' provides a translation signal for each port and the store queue provides finish valid signals for each port.

Referring now to FIG. 8, in this embodiment, since two instructions can be handled per cycle, instructions 1 and 2 are dispatched during cycle 1 and instructions 3 and 4 are dispatched during cycle 2, shown generally at 602. Next, load/store generation of EA1 and EA2 occurs in the first half of cycle 2 and load/store execution of EA3 and EA4 occurs in the first half of cycle 3, shown generally at 604. Next, the cache is accessed for the translated addresses of instructions 1 and 2 between the second half of cycle 2 and the first half of cycle 3, and the cache is accessed for the translated addresses of instructions 3 and 4 occurs between the second half of cycle 3 and the first half of cycle 4, shown generally at 606.

Next, the architected register files (GPRs) are accessed, shown generally at 608. The data for instructions 1 and 2 is accessed at cycle 3, and the data for instructions 3 and 4 is accessed at cycle 4.

Next, the data for real addresses (RA1–RA4) are provided from translation unit and data valid signal for instructions 1–4 is provided to the store queue 312, shown generally at 610 and 612, respectively. In this embodiment, the data valid signal for instructions 1 and 2 is provided during cycle 4 and the data valid signal is provided for instructions 3 and 4 are provided during cycle 5. RA1 and RA2 are provided during the second half of cycle 3, and RA3 and RA4 are provided during the second half of cycle 4.

In this embodiment, the store queue 312' is loaded with real address values for instructions 1–4 during cycles 4 and 5, respectively, shown generally at 614. The store queue finish for each of the instructions 1–4 takes place during the same cycles that the store queue real addresses are loaded, shown generally at 618. Next, the data for instructions 1–4 is loaded into the store queue 312' if it is available, during cycles 5 and 6, respectively, shown generally at 616.

After the stall condition, shown at 621, then the four instructions can be completed simultaneously, shown at 622. The instruction unit then initiates a completion signal for instructions 1–4 through cycles n+1. Also, since all the instructions have been marked as completed, the dispatch unit can dispatch instructions 5–8 at the same time (cycle N+2) shown at 624.

If the processor has reached its limit as to the maximum number of outstanding instructions in cycle N+2 up to 4 instructions can be dispatched, whereas the prior art implementation only one instruction could be dispatched. This saves 3 cycles when instruction 8 is dispatched.

In a system and method in accordance with the present invention, since multiple store instructions are handled together the instructions can be completed together, thereby substantially reducing the number of cycles to complete the store instructions. The bottleneck of a maximum number of instructions that can be dispatched by the instruction unit is alleviated by eliminating the completion queue entries required by the conventional system thereby enabling the instruction unit to dispatch new instructions.

Figure 9:
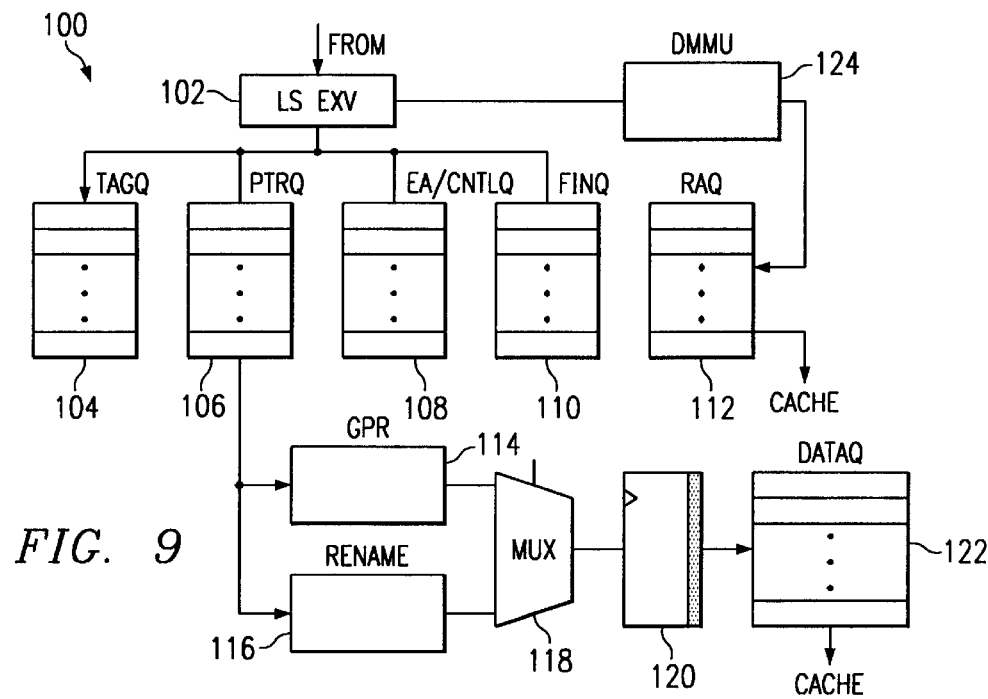
FIG. 9 is a block diagram illustrating a processor according to an embodiment of the invention which accesses the GPRs, FPRs and renames.

Referring now to FIG. 9 there is shown a circuit 100 for reducing the dispatch bottleneck according to a further embodiment of the invention. In this embodiment, the rename registers 116, in addition to the GPRs 114, are provided with a read port which allows them to pass data to a data queue 122 Via Multiplexer 118. The circuit 100 also includes a tag queue 104 for storing instruction tags used by the circuit 100 for aligning the address and data associated with a particular store instruction in the various queues. Each field in the tag queue 104 is preferably n-bits wide, with n being selected such that a sufficient number of tags may be assigned to uniquely identify all Store instructions pending in the processor. Each field in the tag queue is also associated with a valid bit to indicate whether the data contained in the tag field is a valid pending instruction. The valid bit is initially asserted when the instruction is executed by the LSU and the tag is passed into an entry in the tag queue. The valid bit is unasserted after the data corresponding to the store instruction is passed from the data queue into the cache as will be described in greater detail herein. When the valid bit is unasserted, the entry is available for re-use by a subsequent store instruction. FIG. 10A depicts an individual entry in the Tag Queue 104.

The circuit 100 also includes a pointer queue ("PTRQ") 106 which contains information for selecting a particular GPR or rename register file entry which contains the data required by a particular store instruction. FIG. 10B shows the fields which are contained in an exemplary pointer queue entry. More particularly, the store pointer queue is the mechanism which insures that data is loaded into the proper entry of the stored data queue 122. Since data can be returned out of order from the FXU or FPU execution units, the store pointer queue is necessary. In one embodiment, the store pointer queue is an n-deep push down queue. The bottom two entries are checked by LSU Logic 102 to make data requests from either the FXU or FPU execution units. The architected register file pointer is used to address the FXU (GPR) or FPU (FPR) register files while the rename register file pointer is used to address the FXU (rename) or FPU (rename) register files. Both the architected and rename register files are accessed in parallel. The data that is passed to the DATAQ 122 is determined by the R/A bit in the relevant PTRQ entry. If the R/A bit is set, then the architected copy is used, whereas, if the R/A bit is not set, then the renamed data is selected by multiplexor 1 18. The initial value of the R/A bit is assigned at dispatch time from the rename unit and is passed along with the instruction to the load/store execution unit. This is a dynamic bit which must be maintained by LSU logic because the location of the source data for the store instruction can move from the rename to the architected register file before the store pointer can access the data. In other words, initially the store is determined to be in rename (R/A=0), but before the store pointer queue can access the data from the rename, the instruction unit completes the instruction which was to modify the GPR that is the source for the store instruction. This causes the rename data to be loaded into the architected register file. LSU logic in turn modifies the R/A bit from zero to one for the relevant PTRQ entry.

When the data is accessed from the rename or architected register files, the store pointer tag field is used to align data in the store data queue with the corresponding entry in the store tag queue, which has a matching tag value. The V-bit simply indicates whether the store pointer queue entry is valid.

Every cycle, the two bottom entries in the pointer queue are scanned and the data contained in entries in the GPR and the rename file is passed to the multiplexer 118. Control logic checks the valid bits associated with the GPR and rename file entries. If the data in the entries is not valid, then it is not passed to the data queue. The data is essentially "thrown away" and the pointer queue entry is re-scanned in the next cycle. Eventually, the data required by the store instruction will be written into the rename register, and the rename valid bit will be asserted which corresponds to that particular rename register. When the data is passed into the data queue, control logic unasserts the valid bit in the pointer queue entry. This allows a subsequent store instruction to re-use the pointer queue entry since the pointer queue (and the finish queue) is not aligned by the tag queue.

Circuit 100 also contains the store finish queue ("FINQ") 110. The store finish queue 110 is responsible for finishing store instructions. This is also an pushdown queue. The finish queue 110 holds the unique store tags generated during the address generation cycle, but only those which are marked as "final" request per IID, where IID refers to the instruction identifier which is assigned to each instruction upon dispatch and is used to track the instruction through the processor. More specifically, in one specific embodiment of the invention, any mis-aligned instructions (i.e. the data required by the store instruction is misaligned on the cache boundaries) have two cache access requests per IID and only the second request tag is placed in the finish queue. For aligned instructions, each request is marked "final" and has its tag placed in the finish queue. Of course, handling of misaligned instructions is highly dependent on the particular architecture used with the invention.

In this version of the invention, the oldest two entries are scanned by LSU logic to see if they can be finished. Depending on timing considerations, the invention is readily adaptable to scanning more or less entries during each cycle. It is understood that store instructions can be finished out of order, i.e., if the oldest entry cannot be finished for some reason, but the second oldest can. The tags for the two oldest instructions in the store finish queue 110 are compared with the tags in the store tag queue 104 to determine which entry in the store EA/control queue 108 (described in greater detail herein) should be checked. A store instruction can be finished once its real address and data have been loaded into the real address queue 112 and the store data queue 122, respectively, or the address is loaded in the real address queue and the data is being loaded into the data queue. Once an instruction can be finished by the finish queue, then its IID, which is obtained from the store EA/control queue 108, and finish signals are sent to the instruction completion unit (not shown).

Again, the V-bit simply indicates the store finish queue entry is valid. When the finish queue is initially loaded by an executed instruction, the valid bit is asserted. When the entries in the real address queue and data queues corresponding to the store instruction are valid, the finish report is sent to the completion unit and the finish queue valid bit is unasserted. In other words, the finish queue operates to insure that the real address as well as the data required by the store instruction are both available before the store instruction can be completed. The finish report includes the IID obtained from the EA/CNTLQ entry corresponding to the instruction, as well as any exception information.

The circuit 100 additionally contains the effective address control queue "EA/CNTLQ" 108. FIG. 10D shows an exemplary EA/CNTLQ entry. The store EA/CNTLQ 108 is an n-deep pushdown queue. It holds the effective address which will be forwarded to the data cache along with the real address and store data to update memory. This queue also contains the IID which will be used by the store queue to finish the store instruction to the instruction completion unit. The E-bit is the exception bit which will prevent this entry from being forwarded to data cache if an exception occurred during execution. The E-bit may be manipulated by a variety of resources on the processor as a matter of design choice. For example, in one embodiment of the invention, the E-bit is set by the address translation logic of the DCMMU on certain events, such as a store interrupt.

The C-bit is the completion bit which means the store instruction has been architecturally completed by the instruction completion unit and the store to memory should take place. Only completed stores may be forwarded to the data cache. The C-bit is asserted for a particular EA/CNTLQ entry only when corresponding entries in the tag queue, data queue and real address queue are valid for the store instruction concerned, and the completion unit indicates that this instruction has been completed. After the data is passed from the data queue to the cache, the valid bit in the corresponding EA/CNTLQ entry is unasserted. At the same time, the valid bits in the tag queue, data queue and real address queue are also unasserted for their respective entries.

At this point, one important advantage of the invention will become clear to those of skill in the art. Since the address and data required by a store instruction is already held in the address and data queues, when it is time for the instruction to complete, i.e., the IID of the instruction becomes the next-to-complete entry in the completion table, the instruction can be completed without having to perform a read from the architectural or rename register files. Instead, the data is simply passed into the cache from the data queue. In this version of the invention, it will be assumed that the data queue is only provided with a single read port and, consequently, only one store instruction can have its data moved to the cache per cycle. However, since no read of the register files is required, the invention permits several IIDs to be passed from the completion unit to the EA/CNTLQ in a single cycle, setting the C-bits for each of the relevant entries. Once the IIDs have been passed, the entries in the completion table may be reused by subsequent instructions. This frees multiple entries in the completion table in a single cycle and prevents dispatch stalls which would otherwise result if the completion table is full.

Other miscellaneous control bits may be provided for various purposes depending on the architectural implementation of the invention, for instance, control of the store formatter to format the data to the memory alignment. The V-bit indicates the store EA/CNTLQ queue entry is valid and is asserted when an entry is loaded, and unasserted as described above.

Another queue used by circuit 100 is the real address queue ("RAQ") 112. This queue stores the real address for cache accesses by the store instructions which are pending the in completion buffer (not shown). The addresses in this queue are passed to the cache, along with the corresponding Store data, in order to effect the actual write to memory.

Finally, circuit 100 has a data queue 122 which stores the data required by the various store instructions which are pending in the completion buffer (not shown). The data queue 122 receives data from either the GPR or the rename register files, depending on the location of the data at the time the associated Store instruction is executed.

The operation of one version of the invention is as follows. On dispatch, a store instruction is passed to the Load/Store Unit logic 102 from the Dispatch Unit (not shown). The dispatch unit assigns the store instruction an identification tag ("IID") which is used to track the store instruction throughout the processor. On the following clock cycle, the LSU 102 calculates the effective address for the instruction, and also assigns the instruction a unique tag for identification. Note, the IID is to be distinguished from the tag created by the LSU and stored in the TAGQ 104. The tag identification, in this embodiment, is used only internally to the LSU. This simplifies the logic design because of the possibility that an IID assigned to a store instruction, by the dispatch unit, could be reissued before the original store was sent to the data cache. Although circuitry could certainly be provided to allow use of the IID to align data within the LSU queues, this embodiment employs a separate tag as a matter of design choice. The LSU logic 102 then passes the tag into a tag queue ("TAGQ") 104 which is used to maintain alignment between the various queues in the circuit 100 in a manner that will be described in greater detail herein.

During the same cycle, the LSU logic also passes the instruction and its tag to the pointer queue ("PTRQ") 106. The PTRQ 106 in this embodiment is a simple push-down queue. Each entry in the PTRQ contains a tag field ("T"), a GPR pointer, a rename pointer, a rename/architected bit ("R/A"), and a valid bit ("V") as shown in FIG. 10B. The T field contains the identification tag for the instruction that was assigned by the LSU logic 102 in the previous cycle. The GPR field contains the GPR pointer associated with the instruction on dispatch. Similarly, the rename pointer contains the rename pointer associated with the instruction on dispatch, although this information comes from the rename control logic since it is not a part of the instruction decode. The R/A bit identifies the location which contains the data associated with the instruction, i.e., whether the data is in a rename register or if it is architected in the GPRs. In one embodiment, if the R/A bit is set then the data for the instruction is stored in a GPR entry. If the data required for the store instruction is in the GPRs, there is no need to update the R/A bit because it is certain that the architected register will not change until after the store instruction which requires that data is completed.

However, if the R/A bit is not set, then the data is located, or will be located, in a rename register entry. In this case, the R/A bit must be updated in the PTRQ 106 as described below. The LSU logic 102 obtains the R/A bit from the rename register control logic (not shown) and passes it to the PTRQ 106 simultaneously with the other information. If the data for the store instruction is to be obtained from the rename registers, then the rename entry's valid bit indicates whether the rename data is valid, i.e., whether the instruction that was to generate the data has written it into the rename register, or whether the generating instruction is still pending. The R/A bit is used in conjunction with the rename entry's valid bit to allow data for the store instructions to be passed, if available, into the DATAQ 122 on each cycle.

Specifically, the PTRQ 106 is scanned on each cycle by LSU logic 102 which is provided for this purpose. When a PTRQ entry is scanned, the rename pointer in the PTRQ entry is compared with the completion unit's writeback vector (also a rename pointer) to determine if the corresponding R/A bit should be set. More specifically, each entry in the completion unit contains a "writeback vector" field which corresponds to the rename register in which the data for a completing instruction is located. The writeback vector is used by logic on the processor to write the data from the rename register into the architected register targeted by the instruction which generated the data. When a comparison is found between a rename pointer in a pointer queue entry and the writeback vector in the completion table, this indicates that the instruction which generated the data needed by the store instruction has completed and is now architected in a GPR entry. Thus, the data required for that particular store instruction will no longer be found in the rename registers, but will be architected in the GPRs. Accordingly, the LSU logic toggles the R/A bit in the pointer queue entry.

PTRQ 106 is also scanned to determine whether there are any entries having data which is ready to be passed to the DATAQ 122. For timing reasons it may be desirable to scan only a portion of the PTRQ 106, such as the last two entries, although this is a matter of design choice. Scanning the PTRQ 106 allows instructions to have their data written into the DATAQ 122 out of order. For example, if the last, and hence the oldest, entry in the PTRQ 106 is scanned, and it is found that its data is stored in the rename registers, but the rename valid bit indicates that the data has not yet been received from the prior data generating instruction, then the data for the oldest instruction in the PTRQ 106 can not be passed into the DATAQ 122. The logic then scans the next-to-oldest entry. If the R/A bit is set for this entry, then the data for this entry is contained in the GPRs. In this case, the LSU logic selects the appropriate GPR entry using the GPR pointer along with the R/A bit, and stores the data in the data queue. The particular DATAQ which receives the data from the GPR is the one that corresponds to the same entry in a TAGQ, as before. In other words, the processor compares the T field in the pointer queue to the T field in a TAGQ for the relevant store instruction. If the tag for the relevant store instruction is stored in the fourth entry in the TAGQ then the data received from the GPR will be written into the fourth entry in the DATAQ. In this way, the TAGQ maintains alignment between the DATAQ, RAQ and EA/CNTLQ. For each particular store instruction, the entry in each of the TAGQs, EA/CNTLQs, RAQs and DATAQs will have information relevant to that instruction.

The data from the selected entry is passed through the multiplexor ("MUX") 118 to the latch 120. It will be noted that the MUX 118 is used to select whether a particular is passed to the latch 120 from a GPR or rename register entry. Specifically, the R/A bit for the PTRQ 106 entry is provided as an input to the MUX 118 select line. If the bit is set then GPR data is selected. If the bit is reset then rename register data is selected.

On the following clock cycle, the data is passed from the latch 120 into the DATAQ 122. In order to maintain proper data alignment, the tag is used to select the appropriate entry in the DATAQ 122 to receive the data. This entry in the DATAQ 122 will further correspond to the appropriate real address stored in the RAQ 112. This is described in greater detail with respect to the following example. Assume that an instruction is assigned a tag identifier of 06 by the LSU 102. Assume further that the fourth entry is the next available entry in the TAGQ when the tag is passed from the LSU 102. Thus, the tag 06 will be written into the fourth entry of the TAGQ 104 by the LSU 102. After address translation, the DCMMU (not shown) passes the real address of the cache location targeted by the store instruction, along with the tag, to the RAQ 112. The LSU control logic compares the tag for the returning real address to the tags stored in the TAGQ 104. The comparison in this case shows that tag 06 is stored in the fourth entry of the TAGQ 104 as mentioned earlier. Accordingly, the LSU control logic will cause the returning real address for the store instruction assigned tag 06 to be written into the fourth entry of the RAQ 112. Similarly, when the data for the store instruction having tag 06 is written into the DATAQ 122, the LSU control logic first scans the TAGQ 104 to determine that tag 06 is stored in the fourth entry of the TAGQ and then writes the data from latch 120 into the fourth entry of the DATAQ 122. Of course, those of skill in the art will recognize that other techniques for maintaining data alignment could be easily adapted as a matter of design choice.

At this point, it will be understood that the circuit in the embodiment above is pipelined to allow multiple store instructions to "queue up" real addresses and data into entries in the RAQ 112 and DATAQ 122, respectively. Consequently, at completion, there is no need for a store instruction to access the GPR. Instead, at completion, the appropriate store queue entries are marked complete and can be forwarded to the cache in order. The required data is passed from the appropriate DATAQ 122 entry, along with corresponding cache address stored in the RAQ 112, to the cache.

Figure 11A:
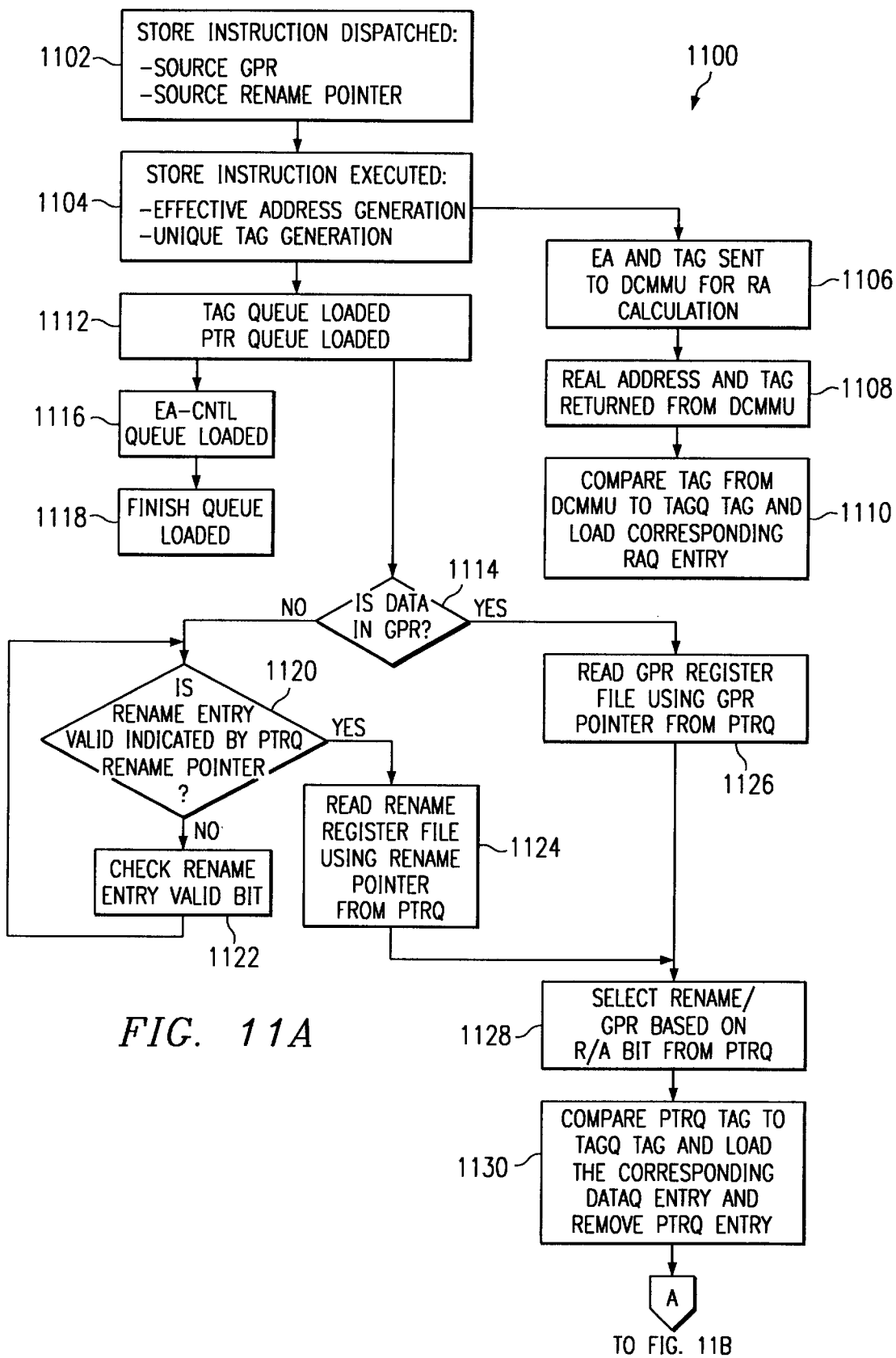
FIGS. 11A–11B are a flow chart illustrating the operation of a processor according to an embodiment of the invention.
Figure 11B:
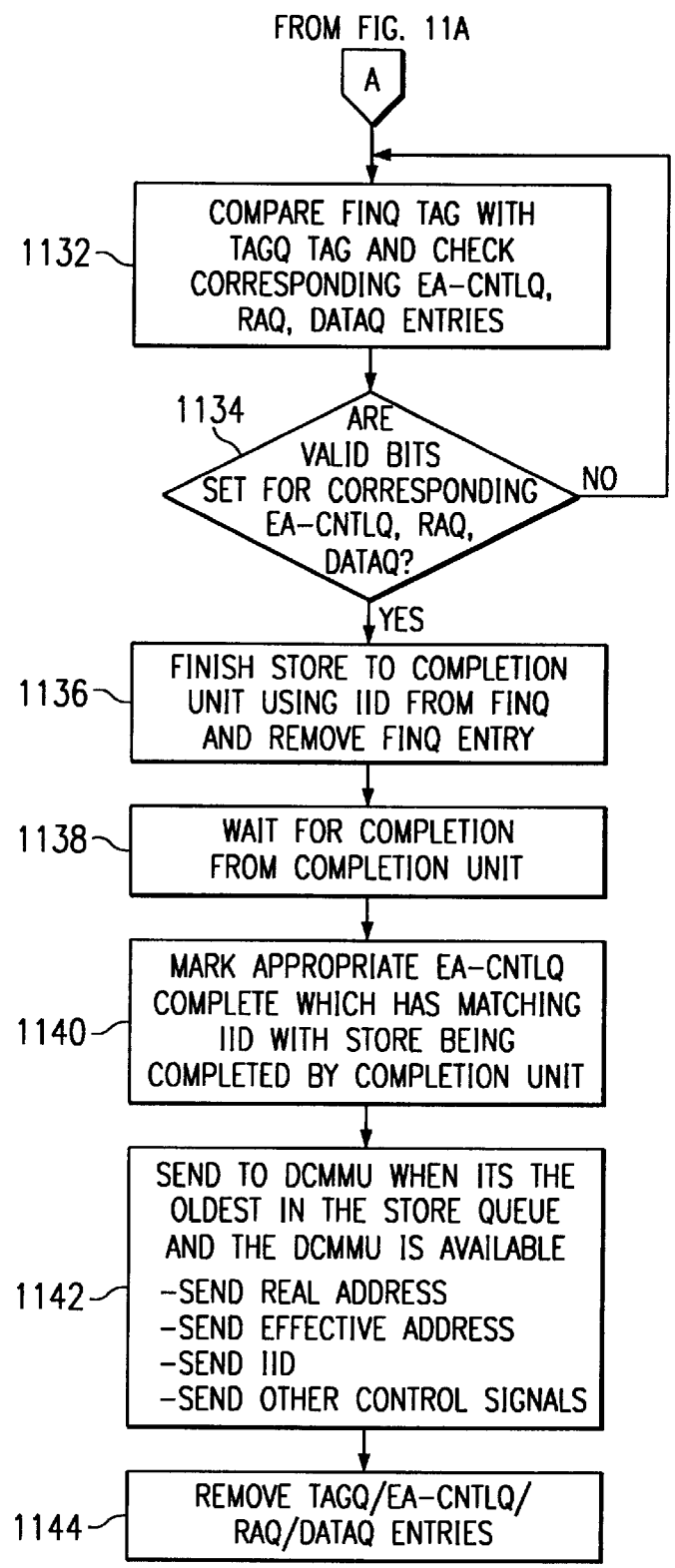

In FIGS. 11A and 11B, there is shown a flow chart illustrating the operation of an embodiment of the present invention. In step 1102, the store instruction is dispatched to LSU logic. The decoded instruction contains the architected register that has the data required for the store instruction. If the corresponding GPR entry has not yet been updated for this data, then the corresponding rename register pointer is obtained from renamed logic as described previously. The flow then proceeds to step 1104 where the instruction is executed and the effective address is generated from the decoded instruction data. At the same time, the tag is also generated by the LSU control logic. In step 1106, the effective address and tag are sent to the data cache memory management unit ("DCMMU") for calculation of the real address by the DCMMU. After the real address is calculated by the DCMMU, it is returned, along with the tag, in step 1108 to the LSU control logic which, in step 1110, compares the tag from the DCMMU to the TAGQ tag and loads the corresponding real address queue entry with the real address returned from the DCMMU. In other words, if the TAGQ for the particular store instruction is stored in the fourth TAGQ entry, then the real address returned from the DCMMU will be stored in the fourth entry of the real address queue in step 1110.

Also after completing step 1104, the processor continues to step 1112 where the TAGQ and the pointer queue are loaded with the tag generated in step 1104 and the architected/rename file pointers. Typically, the EA/CNTLQ and the finish queue are loaded in steps 1116 and 1118, respectively.

In step 1114, LSU control logic checks the R/A bit in the store pointer queue entry for the relevant store instructions to determine whether the data required by the instruction is stored in a GPR entry. If not, the system proceeds to step 1120 where it checks to see if the rename entry corresponding to the required data is valid. If the data required by the store instruction is not in the GPR and is not valid then in step 1122 the processor loops back to step 1120. If, in step 1120 the data in the rename entry is valid, then flow proceeds to step 1124 and the rename register file is read using the rename pointer from the pointer queue. Ultimately, if the data required by the store instruction is in the GPR in step 1114, then flow proceeds to step 1126 and the corresponding GPR file is read using the GPR pointer from the pointer queue.

After reading either the rename or GPR register file, flow proceeds to step 1128 and the corresponding rename/GPR file is selected based on the R/A bit from the PTRQ for the corresponding store instruction. The tag in the PTRQ is compared with the TAGQ to determine the corresponding DATAQ entry to receive the data from the Multiplexer. Again, if the tag for the relevant store instructions is in the fourth entry of the TAGQ then the data read from the rename or GPR will be written into the fourth entry in the DATAQ. Simultaneously, the pointer queue entry is removed from the pointer queue.

After the data is written into the DATAQ entry in step 1130, the processor then proceeds to step 1132 where it determines whether the store instruction is ready to be finished. For this operation, the LSU logic scans the finish queue tags and compares those tags with those in the TAGQ. In one version is the invention, only the two bottom FINQ entries are scanned in one cycle. However, this is a matter of design choice and more, or less of the FINQ entries could be scanned in a single cycle. The tag from a particular finish queue is compared to the TAGQ tags to determine the corresponding TAGQ entry for the tag retrieved from the finish queue. Again, if the particular tag from the finish queue is found in the fourth queue entry then the processor checks the corresponding fourth entry in the EA/CNTLQ, RAQ, and DATAQ entries. For each of these corresponding entries, the processors determines whether the valid bits are set in step 1134. If not, the processor loops back to step 1132 and repeats steps 1132 and 1134 until the valid bits are set for the corresponding entry in each of the three queues mentioned above.

Afterward, flow proceeds to step 1136 where the store instruction is completed by comparing the IID from the EA/CNTLQ to the corresponding IID in the completion unit queue. Simultaneously, the corresponding finish queue entry is removed. In step 1138 the processor waits for completion from the completion unit. At completion, the corresponding entry has certain control bit set indicating that, the processor is ready to transfer the data from the DATAQ into the cache memory. It will be noted that, in this embodiment of the invention, the actual transfer of the data from the DATAQ into the cache may be several cycles after the corresponding store instruction is marked as complete due to a variety of factors which may be occurring on the processor. In step 1140, the appropriate EA/CNTLQ entry is also marked as complete by setting its C-bit.

In step 1142 the processors then send to the DCMMU the real address, effective address, instruction ID, and other required control signals needed to transfer data from the DATAQ into the cache. Finally, in step 1144 the TAGQ, EA/CNTLQ, RAQ, DATAQ entries corresponding to the completed store instructions are removed from their respective queues to free up space for subsequently dispatched store instructions.

Figure 12:
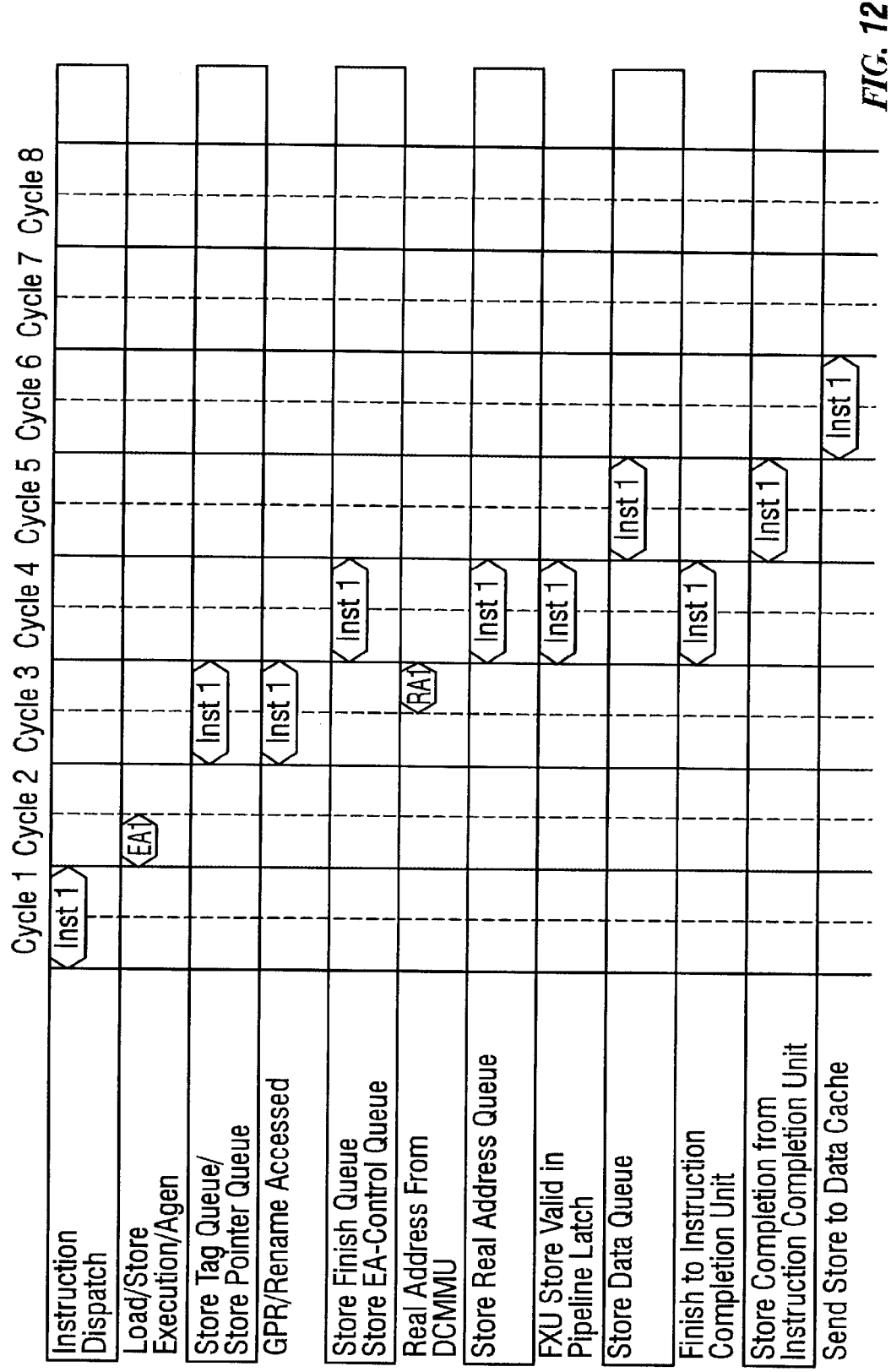
FIG. 12 is a timing diagram illustrating the operation of a processor according to an embodiment of the invention.

FIG. 12 depicts a timing diagram illustrating the operation of the circuit described in the embodiment above. The timing diagram in FIG. 12 will be discussed also with reference to the block diagrams of the processor as shown in FIGS. 1 and 2. In cycle 1, the store instruction is dispatched from the instruction cache 14 and decoded by the dispatch unit 46. The decoded instruction is then passed to the Load/Store Unit ("LSU") 28. In the first half of cycle 2, the LSU 28 calculates the effective address for the instruction. This is sometimes referred to herein as address generation or "agen," or execution. Those of skill in the art will be familiar with different modes of memory addressing and the differences between effective and real addresses. It will be recognized that the invention is readily adaptable to numerous memory addressing schemes, any of which may be utilized as a matter of design choice. The present embodiment will be described with respect to the exemplary memory addressing schemes employed by the "PowerPC" family of processors available from IBM Corp. Such memory addressing modes are described in great detail in commercially available publications, such as "PowerPC Microprocessor Family: The Programming Environments," available from IBM as publication number MPRPPCFPE-01, incorporated by reference as though set forth in full.

Also in cycle 2, the tag for the instruction is generated by the LSU 28. The effective address and instruction tag are passed to the memory management unit for real address calculation at the end of the cycle.

In cycle 3, the pointer queue 106 and tag queue 104 are updated by the LSU 28. The information passed to these queues has been discussed previously. Also, the real address is returned from the memory management unit in the data cache 16. Also in cycle 3 the GPR is accessed (assuming that the data for the store instruction is in the GPR). For timing reasons, it may be desirable to latch this data for one cycle before passing it to the DATAQ. Thus, in this embodiment, the LSU control logic generates the FXU Store Valid Pipeline Latch signal in cycle 4 to latch the data into latch 120.

In cycle 5, the Finish Instruction signal is generated. The finish queue, as discussed previously, is used to finish store instructions. It contains the unique store tag. Each entry in the finish queue is scanned, comparing the tag of the finish queue entry to find a match in the TAGQ. If the corresponding TAGQ entry has a DATAQ and RAQ valid bit set then the corresponding IID from the EA/CNTLQ is finished. In one embodiment, the finish queue is handled like the pointer queue and the bottom two entries are scanned. However, as stated previously, stores can finish out of order. The finish signal is sent to the completion unit indicating that the store instructions can be completed when it is the next to complete instruction in the completion queue.

Still in cycle 5, the Store instruction data is passed from the latch 120 to the DATAQ 122. One suitable method for aligning the data into the appropriate entry in the DATAQ 122 has been described previously. At this point, the Store instruction is ready to complete in cycle 5, because the data is being loaded from the multiplexor in cycle 4, i.e., the cycle in which the instruction is finished.

The completion unit can complete multiple instructions in a single cycle. As discussed previously, completion simply marks up the four entries in the store queue complete, which means these can be sent to the DATAQ. The completion bit for each entry is maintained in the EA/CNTLQ. The LSU sends the oldest completed store queue entry to the cache when the cache is available, (i.e., to cache if not busy with a higher priority request.)

Thus, it will be clear to those of skill in the art that by accessing the rename register file data store instructions in tightly coupled loops, the instructions can be completed more efficiently, thereby reducing the number of dispatch stalls caused by the completion buffer being full. Although the present invention has been described in accordance with the embodiments shown, one of ordinary skill in the art will recognize that there could be variations to the embodiment and those variations would be within the spirit and scope of the present invention. Therefore, although the present invention was described in terms of completing four store instructions at a time, one of ordinary skill in the art readily recognizes, that any number of store instructions can be completed and they would be within the spirit and scope of the present invention. Accordingly, many modifications may be made by one of ordinary skill without departing from the spirit and scope of the present invention, the scope of which is defined by the following claims.

What is claimed is:

1. A method for processing store instructions in a processor, the method comprising the steps of:

(a) dispatching a first store instruction and at least one additional store instruction from a dispatch unit;

(b) executing the first store instruction to determine a real address memory location for storing data targeted by the first store instruction, and to determine an entry in a register file containing the data targeted by the first store instruction, the register file comprising alternatively an architected register file and rename register file;

(c) passing the data targeted by the first store instruction from the entry in the register file to an entry in a data queue before the first store instruction completes, said data targeted by the first store instruction passing through a multiplexer arrangement between the data queue and the architected register file and rename register file;

(d) executing at least one additional store instruction to determine a real address memory location for storing data targeted by the respective additional store instruction and to determine an entry in the register file containing data targeted by the respective additional store instruction;

(e) passing the data targeted by the respective additional store instruction from the register file to a respective additional entry in the data queue before the respective additional store instruction completes, said data targeted by the respective additional store instruction passing through the multiplexer between the data queue and architected register file and rename register file;

(f) passing the data targeted by the first store instruction and the data targeted by at least one of the additional store instructions from the data queue to cache memory upon completion of the first store instruction and said at least one additional store instruction in a single clock cycle.

2. An apparatus for processing a store instruction in a superscalar processor that employs in-order completion of instructions, the processor having an instruction dispatch unit coupled to an architected register file, a rename register file, a load store unit, a completion unit, and cache memory, the apparatus comprising:

(a) a pointer queue having an entry corresponding to the store instruction, the entry containing a pointer to each entry in the architected and rename register files that contains data required by the store instruction; and (b) a multiplexer coupled to read ports on the architected and rename register files to facilitate passing data required by the store instruction from the architected and rename register files into an entry in a data queue, the data queue being coupled to the cache memory.

3. The apparatus of claim 2 wherein the entry in the pointer queue further comprises a bit which represents whether the data required by the store instruction is stored in an entry in the architected register files or rename register files.

4. The apparatus of claim 3 wherein a select line of the multiplexer is responsive to the bit in the pointer queue entry to select between data from the architected register files and data from the rename register files.

5. The apparatus of claim 2 wherein the data required by the store instruction is passed from the multiplexer into an entry in the data queue when the execution of the instruction has processed a final result, but before the instruction is completed.

6. The apparatus of claim 5 wherein upon completion of the store instruction, the data required by the instruction is passed from the entry in the data queue into the cache memory.

7. The apparatus of claim 6 wherein during a single clock cycle, data associated with at least one additional store instruction is passed from the data queue to the cache memory along with data associated with the store instruction.

8. The apparatus of claim 2 further comprising a tag queue which contains a tag that uniquely identifies the store instruction.

* * * * *

UNITED STATES PATENT AND TRADEMARK OFFICE
CERTIFICATE OF CORRECTION

| | | |
|---|---|---|
| PATENT NO. | : 6,192,461 B1 | Page 1 of 1 |
| DATED | : February 20, 2001 | |
| INVENTOR(S) | : Barry D. Williamson et al. | |

It is certified that error appears in the above-identified patent and that said Letters Patent is hereby corrected as shown below:

Column 1,
Line 67, change "instruction unit is reduced," to -- instruction unit, is reduced. --.

Column 6,
Line 34, change "(GPRS)" to -- (GPRs) --.

Signed and Sealed this

Twenty-fifth Day of December, 2001

Attest:

*Attesting Officer*

JAMES E. ROGAN
*Director of the United States Patent and Trademark Office*